United States Patent
Nomura et al.

(10) Patent No.: US 10,401,622 B2
(45) Date of Patent: Sep. 3, 2019

(54) VEHICLE WINDOW PLATE

(71) Applicant: AGC Inc., Chiyoda-ku (JP)

(72) Inventors: Daisuke Nomura, Tokyo (JP);
Shunsuke Sadakane, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 213 days.

(21) Appl. No.: 15/497,452

(22) Filed: Apr. 26, 2017

(65) Prior Publication Data

US 2017/0315350 A1   Nov. 2, 2017

(30) Foreign Application Priority Data

Apr. 27, 2016  (JP) ................................ 2016-089865

(51) Int. Cl.
| | |
|---|---|
| *G02B 27/01* | (2006.01) |
| *B60J 1/00* | (2006.01) |
| *B60J 1/02* | (2006.01) |
| *B60K 35/00* | (2006.01) |
| *B60W 50/14* | (2012.01) |

(52) U.S. Cl.
CPC .......... *G02B 27/0101* (2013.01); *B60J 1/008* (2013.01); *B60J 1/02* (2013.01); *B60K 35/00* (2013.01); *B60K 2310/22* (2013.01); *B60K 2350/106* (2013.01); *B60K 2350/1072* (2013.01); *B60K 2350/2052* (2013.01); *B60K 2350/2056* (2013.01); *B60K 2350/2065* (2013.01); *B60K 2350/921* (2013.01); *B60W 2050/146* (2013.01); *G02B 2027/011* (2013.01); *G02B 2027/013* (2013.01); *G09G 2300/04* (2013.01); *G09G 2320/02* (2013.01); *G09G 2320/04* (2013.01); *G09G 2320/06* (2013.01); *G09G 2340/14* (2013.01)

(58) Field of Classification Search
CPC .......... G02B 27/0101; G02B 2027/011; G02B 2027/013
See application file for complete search history.

(56) References Cited

U.S. PATENT DOCUMENTS

| | | | |
|---|---|---|---|
| 9,551,867 B1 | 1/2017 | Grabowski et al. | |
| 2008/0088526 A1* | 4/2008 | Kadantseva | G02B 27/01 345/1.1 |
| 2009/0005961 A1* | 1/2009 | Grabowski | G01C 21/365 701/532 |

FOREIGN PATENT DOCUMENTS

| | | |
|---|---|---|
| CA | 2076420 | 2/1993 |
| JP | 7-195959 | 8/1995 |
| JP | 2005-189725 A | 7/2005 |
| KR | 10-2007-0082108 A | 8/2007 |
| WO | WO 2005/121707 A2 | 12/2005 |

OTHER PUBLICATIONS

Extended European Search Report dated Sep. 7, 2017 in Patent Application No. 17000730.6.

* cited by examiner

*Primary Examiner* — Joseph P Martinez
(74) *Attorney, Agent, or Firm* — Oblon, McClelland, Maier & Neustadt, L.L.P.

(57) ABSTRACT

A vehicle window plate has a maximum value of a variation of a curvature in a vertical direction being ±7.6E-6 mm$^{-2}$ or less at least within a HUD display area. The curvature preferably increases monotonically from a lower side to an upper side at least within the HUD display area.

20 Claims, 12 Drawing Sheets

Line of Sight Moving Downward

FIG. 9B

Line of Sight Moving Downward

FIG. 10

Segment
Before Line of Sight is Moved

After Line of Sight is Moved

FIG. 11

Maximum Value of Variation of Curvature (mm$^{-2}$)

FIG. 12

← Vertical Direction →

VEHICLE WINDOW PLATE

CROSS-REFERENCE TO RELATED APPLICATIONS

This application claims priority from Japanese Patent Application No. 2016-089865 filed on Apr. 27, 2016, the entire subject matter of which is incorporated herein by reference.

BACKGROUND OF THE INVENTION

Technical Field

The present invention relates to a vehicle window plate, and particularly relates to a vehicle window plate suitable for a head up display for displaying an image on the window pane.

Background Art

A head up display (hereinafter also referred to as "HUD") is gaining attraction. In the HUD, an image including various information such as a speed is displayed on a vehicle window plate, particularly a front glass of a vehicle. According to the HUD, an image of a speedometer or the like can be projected and displayed on the front glass and in a region in front of a driver.

In the background art, a driver must turn his/her eyes down to a display apparatus in order to check information such as a speed during running. When the HUD is used, the driver can check the information such as a speed while seeing a traveling direction without turning his/her eyes downward. Therefore, from a point of view of safety, it is requested to introduce more HUDs.

PATENT LITERATURE

Patent Literature 1: JP-A-07-195959

BRIEF SUMMARY OF THE INVENTION

However, there is a fear that the image projected on the front glass may be distorted in a configuration of Patent Literature 1. In order to display a clear image for a driver, it is requested to suppress deformation of the image. Incidentally, such a problem is not limited to the front glass but may occur in common among vehicle window plates.

The present invention provides a vehicle window plate suitable for properly displaying an image projected by a HUD.

The present invention relates to the following (1) to (9).

(1) A vehicle window plate, wherein a maximum value of a variation of a curvature in a vertical direction is ±7.6E-6 mm$^{-2}$ or less at least within a HUD display area.

(2) The vehicle window plate according to the above item (1), wherein the curvature increases monotonically from a lower side to an upper side at least within the HUD display area.

(3) The vehicle window plate according to the above item (1) or (2), wherein an average value of the variation of the curvature in the vertical direction is ±1.2E-6 mm$^{-2}$ or less at least within the HUD display area.

(4) The vehicle window plate according to any one of the above items (1) to (3), wherein the variation of the curvature is constant at least within the HUD display area.

(5) The vehicle window plate according to any one of the above items (1) to (4), wherein a position most distant from a chord connecting an upper side and a lower side serving as a reference is located more closely to the upper side than a center position in the vertical direction.

(6) The vehicle window plate according to any one of the above items (1) to (5), wherein a difference in curvatures between a left end portion and a right end portion is 0.00040 mm$^{-1}$ or less at least within the HUD display area.

(7) The vehicle window plate according to any one of the above items (1) to (6), wherein a maximum value of the curvature is 0.001 mm$^{-1}$ or less at least within the HUD display area.

(8) The vehicle window plate according to any one of the above items (1) to (7), wherein the HUD display area is 10 cm$^2$ or more.

(9) The vehicle window plate according to any one of the above items (1) to (8), wherein the vehicle window plate is a glass plate, the glass plate has an area where a plane stress is formed at an outer peripheral edge and inside the outer peripheral edge, and the HUD display area dose not overlap with the area where the plane stress is formed.

According to the present invention, it is possible to provide a vehicle window plate capable of suppressing deformation of an image.

BRIEF DESCRIPTION OF THE DRAWINGS

FIG. 2A and FIG. 2B are views schematically showing a change in viewpoint using grids.

DETAILED DESCRIPTION OF THE INVENTION

A specific embodiment of a vehicle window plate according to the present invention will be described below in detail with reference to the drawings.

Figure 1:
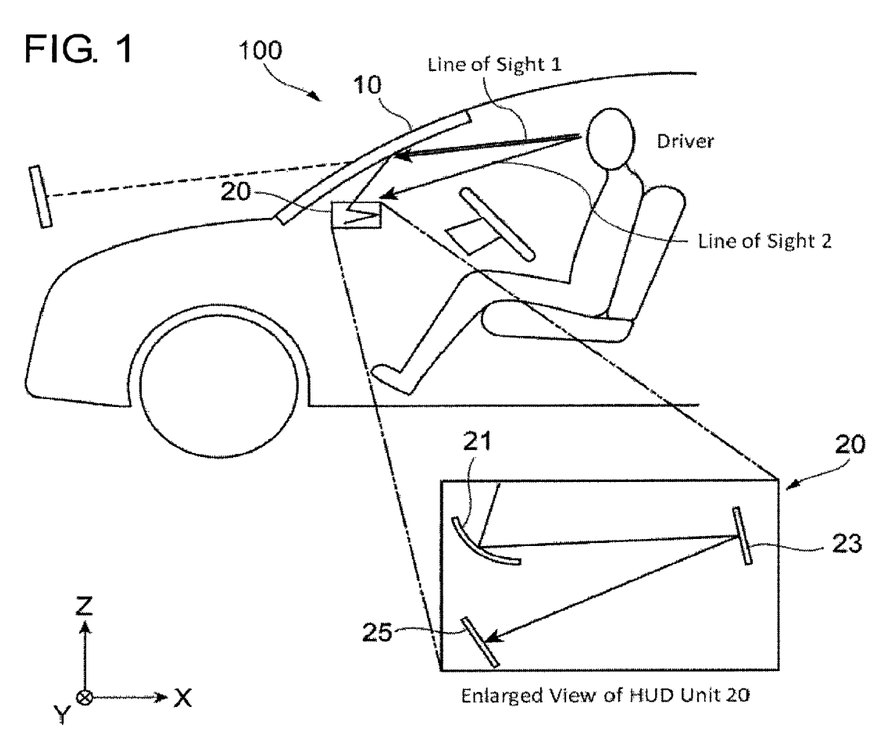
FIG. 1 is a conceptual view of a vehicle mounted with a HUD.

FIG. 1 is a conceptual view of a vehicle mounted with a HUD. A HUD unit 20 is mounted in a lower part of a front glass (vehicle front glass or vehicle window plate) 10 of a car 100 as a vehicle, and inside a dash board. The HUD unit 20 includes a concave mirror 21, a reflecting mirror 23, and a light source (display) 25.

An image such as a speedometer etc displayed by the light source 25 is magnified by the concave mirror 21, and displayed as a virtual image display on the front glass 10. A driver can visually recognize the virtual image display generated by the HUD unit 20 (a line of sight 1) to check the speedometer etc. The driver does not have to turn his/her eyes downward as compared with a case where the driver visually recognizes a background-art meter 30 provided in the dash board (a line of sight 2). Thus, higher safety can be secured by use of the HUD.

However, a curvature in a background-art front glass may differ from one point to another on the front glass. A variation of the curvature on any line on the front glass may also have a variation of values in accordance with how to select the line. Here, assume that the line is a line extending in a Z-direction for convenience of explanation.

Therefore, the present inventor et al. found out that, when an angle of the concave mirror 21 is changed in some stages to change a reflection position (reflection point) on the front glass 10 in the Z-direction in consideration of differences in viewpoints caused by individual differences in drivers' physiques or the like, there arise differences in degree of deformation of the visually recognized image as a whole among the stages. That is, in the background-art front glass, there is a large variation in deformation of the visually recognized image as a whole among drivers different in physiques (hereinafter also referred to as "macroscopic variation").

Incidentally, the angle of the concave mirror 21 may be changed without being limited to differences in physiques among drivers. The angle of the concave mirror 21 may be changed according to the different posture or seat position of the driver.

Incidentally, a displayed image is magnified with increase in curvature of the front glass 10 at the reflection point, and reduced with reduction in curvature of the front glass 10.

On the other hand, the displayed image may have a certain area. When the angle of the concave mirror 21 is changed in such a case, there may occur differences in degree of deformation of the image among points (segments) within the area of the image though the degree of deformation of the image as a whole is allowable. That is, in the background-art front glass, the present inventor et al. found that there may be also differences in curvature among points on the front glass within an area where a single image is displayed, and the variation of the curvature on any line on the front glass may also have a variation of values in accordance with how to select the line, so that the image can be deformed. For example, within an area of a displayed image, the image may be observed to be magnified at one point and reduced at another point. Thus, the degree of deformation of the image may have a variation among the points (hereinafter also referred to as "microscopic variation").

A HUD must be designed in consideration of the aforementioned new findings. That is, the quality of a displayed image must be evaluated in consideration of a variation of deformation in the image as a whole (macroscopic variation) and a variation of deformation within an area where the image is displayed (microscopic variation).

Figure 2A:
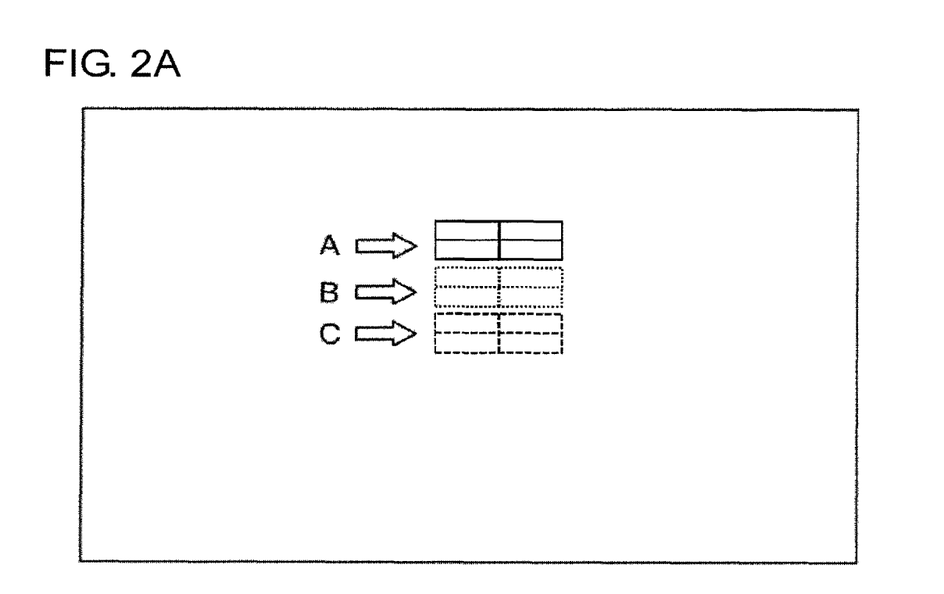
FIG. 2A shows a state in which three different grids corresponding to movement of viewpoints attributable to individual differences have been set.

FIG. 2A and FIG. 2B are views schematically showing an image displayed on the front glass 10. FIG. 2A shows a state in which three different grids are set on assumption that the angle of the concave mirror 21 is changed in three stages. The three grids set thus include a grid A in the upper stage shown by the solid line, a grid B in the middle stage shown by the dotted line, and a grid C in the lower stage shown by the broken line. The three grids are set in advance in positions where a regular driver will visually recognize an image displayed by the HUD. Further, viewpoints are also classified into three viewpoint areas in consideration of differences in physiques among regular drivers. Thus, the three grids are set.

Figure 2B:
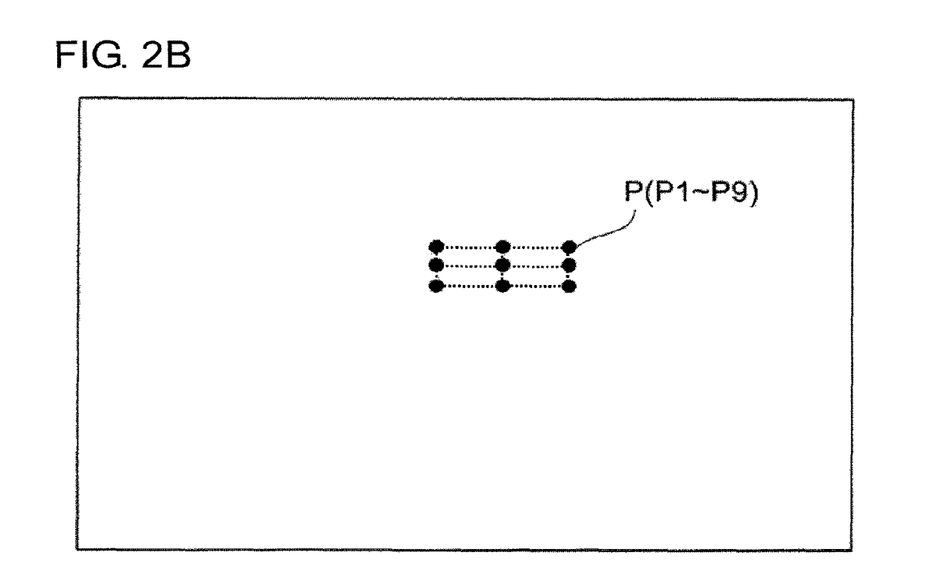
FIG. 2B shows a state in which a plurality of viewpoints P attributable to movement of a viewpoint of each individual have been set.

On the other hand, FIG. 2B shows a state in which a plurality of viewpoints P (nine viewpoints P1 to P9 in the example) attributable to movement of a viewpoint within an area where an image is displayed, while paying attention to the grid B in the middle stage.

The curvature is not constant in any area of the front glass 10. The curvature differs from one area to another in accordance with a designed shape of the front glass 10. Obviously, there are differences in curvatures of the front glass 10 among the three grids A, B and C. There are also differences in curvatures of the front glass 10 among the viewpoints P1 to P9. It may be considered that any image is deformed due to the differences in curvature of the front glass 10. However, it is desired to minimize the deformation.

The present inventor considered this phenomenon. As a result, it was proved that deformation of an image or a variation of the deformation caused by differences in reflection positions on a front glass, that is, a variation of deformation of the image as a whole (macroscopic variation) and a variation of deformation within an area where the image is displayed (microscopic variation) can be suppressed by a front glass having a special HUD curved shape as shown by the graphs of FIG. 3.

Figure 3:
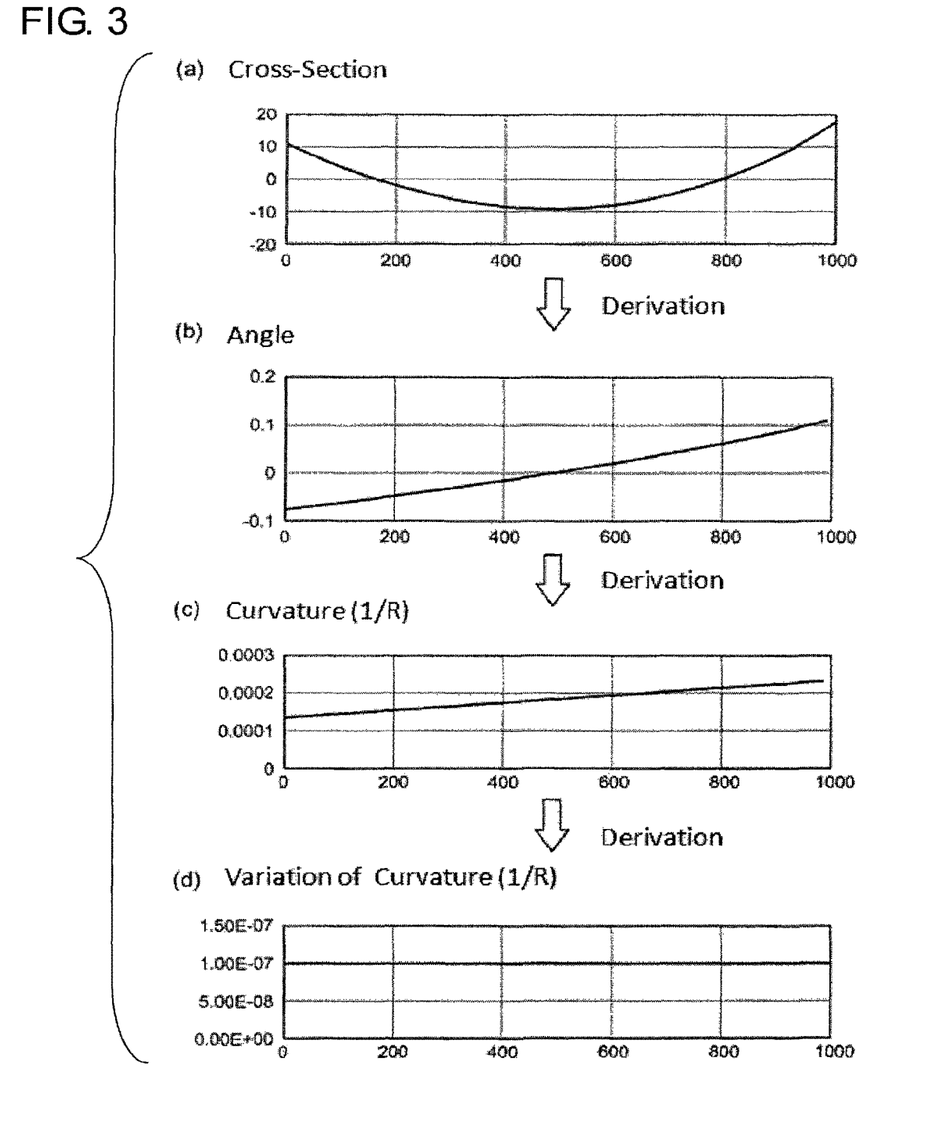
FIG. 3 shows graphs explaining properties of a front glass according to an embodiment of the present invention. The graph (a) of FIG. 3 shows a cross-sectional shape of the front glass. The graph (b) of FIG. 3 shows an angle of a tangential line on a surface of the front glass. The graph (c) of FIG. 3 shows a curvature (1/R) of the surface of the front glass. The graph (d) of FIG. 3 shows a variation of the curvature (1/R) of the surface of the front glass.

In FIG. 3, assume that the concave mirror 21 is designed with a desired curvature, and the reflection point is set at a fixed position on the front glass 10. In addition, assume that the concave mirror 21 is designed to have an inclination that can be changed in several stages so that the reflection point on the front glass 10 can be changed when the inclination is changed.

In each graph of FIG. 3, an abscissa axis designates a vertical direction (Z-direction) position (height position) of the front glass 10 according to the embodiment (unit: mm). A left side of the abscissa axis corresponds to a lower position, and a right side corresponds to an upper position of the front glass 10. The graph (a) of FIG. 3 shows a cross-sectional shape of the front glass in the vertical direction. From the graph (a) of FIG. 3, it can be understood that a surface of the front glass protrudes most forwardly (in front of the vehicle) at an approximately center position in the vertical direction (height position of about 500 mm in the abscissa axis), and the surface of the front glass above and below the most forwardly protruding position is located backward (at the rear of the vehicle). Incidentally, assume that the vertical direction corresponds to a vertical direction in a state where the front glass has been attached to the vehicle.

The graph (b) of FIG. 3 is a graph obtained by first order differentiation of the graph (a) of FIG. 3. The graph (c) of FIG. 3 is a graph obtained by first order differentiation of the graph (b) of FIG. 3 (that is, a graph obtained by second order differentiation of the graph (a) of FIG. 3). The graph (d) of FIG. 3 is a graph obtained by first order differentiation of the graph (c) of FIG. 3 (that is, a graph obtained by third order differentiation of the graph (a) of FIG. 3).

The graph (b) of FIG. 3 shows an angle of a tangential line on the surface of the front glass. The angle 0° is set with reference to the angle of the tangential line at an approximately center position in the vertical direction of the surface (a height position of about 500 mm in the abscissa axis). The angle is negative in a position under the center position (left side of the graph (b)), and positive in a position above the center position (right side of the graph (b)).

The graph (c) of FIG. 3 shows a curvature (1/R) of the surface of the front glass. As is apparent from the graph (c), the curvature in the embodiment increases monotonically from a lower side to an upper side. That is, the surface of the front glass shown in the graph (c) has a curvature increasing as it goes upward. The graph (d) of FIG. 3 shows a variation of the curvature (1/R) of the surface of the front glass. As is apparent from the graph (d), it is preferable that the variation of the curvature is constant in the embodiment.

Incidentally, it is noted that the words "the variation of the curvature is constant" herein may allow a divergence as long as it does not spoil the effect of the present invention.

The inventor found out that deformation of an image or a variation of the deformation can be suppressed independently of a change in position of a viewpoint when the front glass has such a special curved shape.

Incidentally, it can be also considered that an image is not deformed in accordance with a position of a viewpoint as long as the curvature is constant in the vertical direction (that is, the graph (c) of FIG. 3 is horizontal). However, it is preferable that the curvature increases as it goes upward as shown in the graph (c) of FIG. 3, so that the front glass can be connected to a roof of a car without any trouble.

In order to generalize the aforementioned shape, the inventor optically simulated a change in size of an image caused by a variation in curvature of a front glass on the assumption that a concave mirror has a single curvature and a fixed value independently of a reflection position of the glass.

Figure 4:
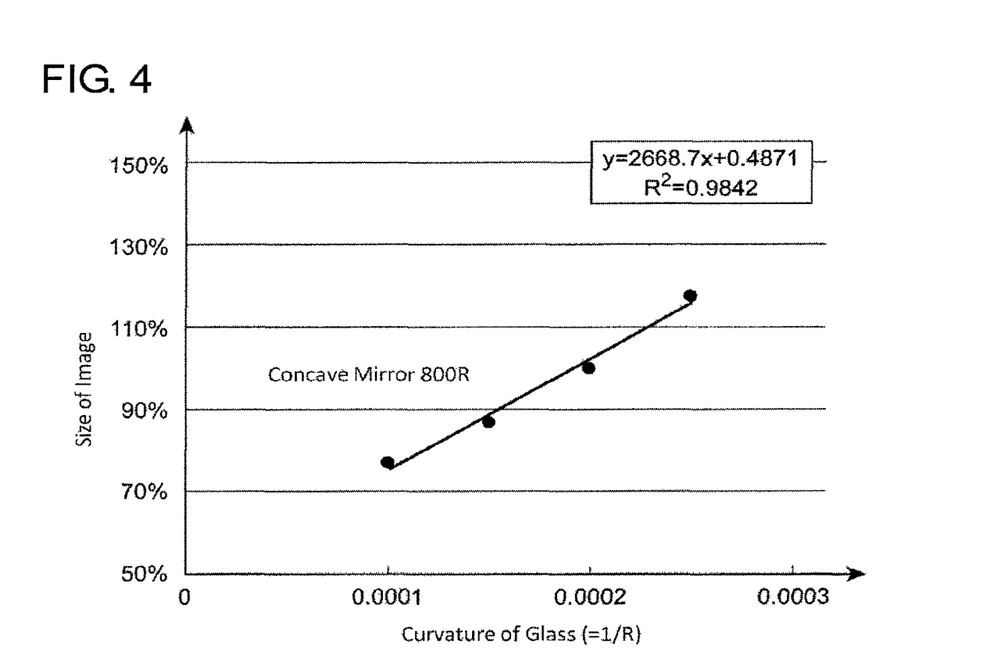
FIG. 4 is a graph showing a relationship between the curvature (x) of the front glass and the size (magnification factor: y) of an image in a state in which a curvature of a concave mirror has been constant to 800 R.

FIG. 4 is a graph showing a relationship between the curvature (x) of the front glass and the size (magnification factor: y) of the image in a state in which the curvature radius of the concave mirror is fixed to 800 mm. Since $R^2$ which is a coefficient of determination for linear correlation is close to 1, it can be understood that the size of the image has a relation of substantially positive linear correlation (y=2668.7x+0.4871) with respect to the curvature of the front glass when the curvature of the concave mirror has a constant value.

In FIG. 4, for convenience of explanation, the size of the image is set as 100% when the curvature of the glass is 0.000192. However, it can be understood that the size of the image has a relation of substantially positive linear correlation with respect to the curvature of the front glass independently of the value of the curvature of the glass as long as the curvature of the concave mirror has a constant value.

Figure 5:
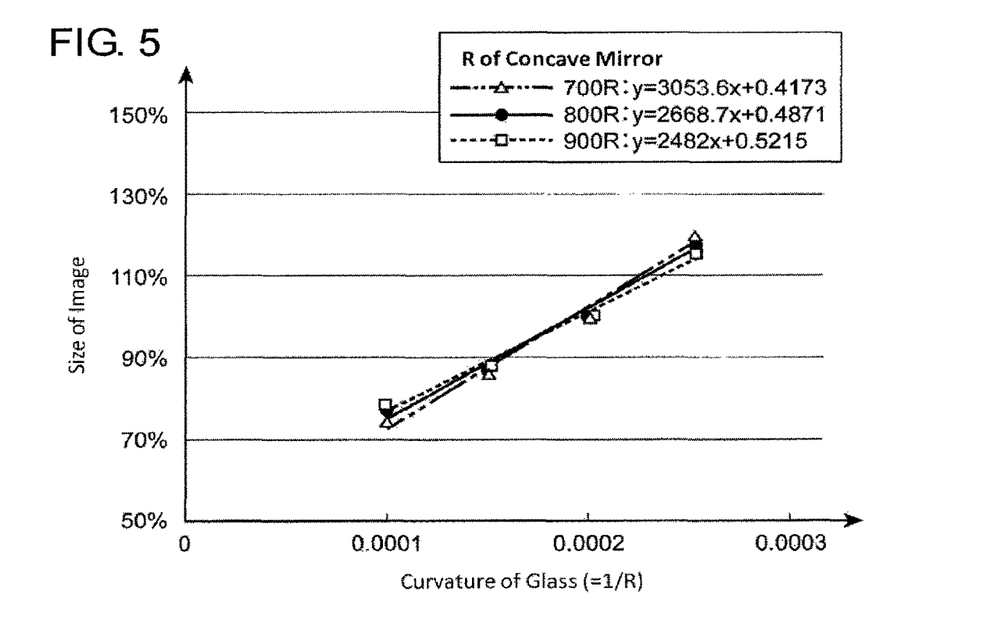
FIG. 5 is a graph showing a relationship between the curvature (x) of the front glass and the size (magnification factor: y) of an image in a state in which a curvature of a concave mirror has been constant to each value of 700 R, 800 R and 900 R.

FIG. 5 is a graph showing a relationship between the curvature (x) of the front glass and the size (magnification factor: y) of an image in a state in which the curvature radius of the concave mirror has been fixed to each value of 700 mm, 800 mm and 900 mm. From FIG. 5, it can be understood that as long as the curvature of the concave mirror has a constant value, the inclination of the correlation indeed has a variation, but the relation of positive linear correlation can be maintained between the size of the image and the curvature of the front glass (y=3053.6x+0.4173 at 700 mm, y=2668.7x+0.4871 at 800 mm, and y=2482x+0.5215 at 900 mm). With increase in curvature of the concave mirror, the sensitivity of the correlation increases (the inclination of the graph increases).

That is, the present inventor found out that there is a substantially positive linear correlation between the curvature of the front glass and the magnification factor of the image. This means that in the front glass having a special curved shape having a constant curvature variation (amount) shown in FIG. 3, any area has a constant magnification factor and a constant deformation amount even when a line of sight is moved.

Figure 6A:
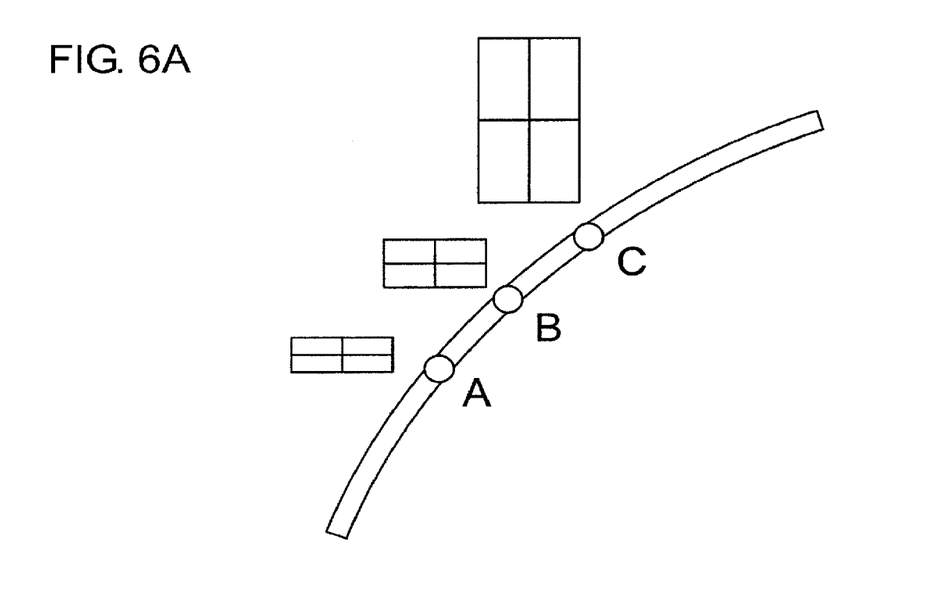
FIG. 6A and FIG. 6B are conceptual views explaining a deformation amount (magnification factor) of an image (grid) when a line of sight is moved, including an explanatory view (FIG. 6A) in which the line of sight is moved from a position A by a predetermined distance, and an explanatory view (FIG. 6B) in which the line of sight is moved from a position B' by a predetermined distance.
Figure 6B:
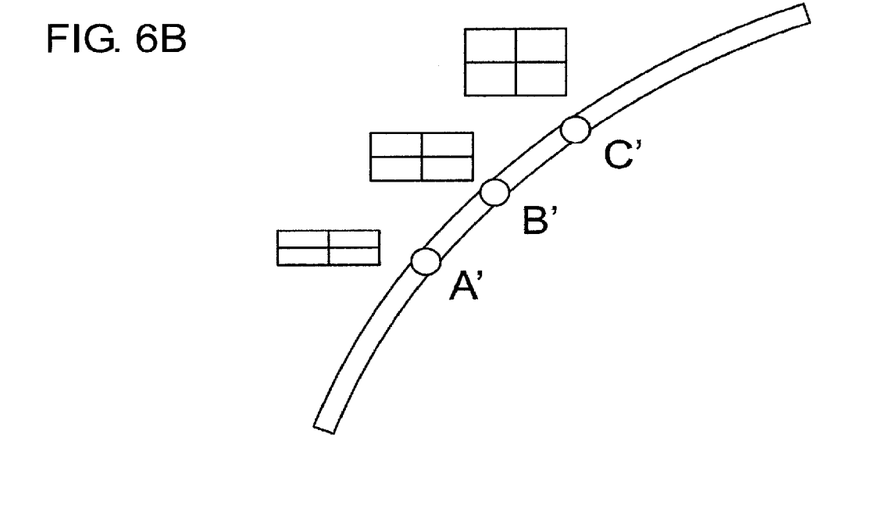

Specific examples will be described with reference to FIGS. 6A and 6B. FIG. 6A shows the background-art front glass, and FIG. 6B shows the front glass in FIG. 3. When an image is displayed with a concave mirror optimized in accordance with a curvature of a glass at a point B, an optimized image is obviously displayed at the point B. The angle of the concave mirror is changed in this state to display an image at a point A moved 10 mm under the point B and an image at a point C moved 10 mm above the point B. In this case, there is a difference in absolute value of the deformation amount between the image at the point A and the image at the point C in the background-art front glass in which the variation of the curvature is not constant. Therefore, there easily arises a problem that, for example, only the point C is magnified largely as shown in FIG. 6A.

On the other hand, in the front glass in FIG. 3, in which the variation of the curvature is constant, the absolute value of a variation amount from an image at a point B' to an image at a point A' is equal to the absolute value of a variation amount from the image at the point B' to an image at a point C' That is, it is possible to suppress an event in which an image is deformed largely in accordance with a reflection position on the front glass. In addition, it is possible to easily estimate the degree of deformation in accordance with a distance from the point B when an image is displayed in a position at the distance.

From above, in the front glass as shown in FIG. 3, it is possible to reduce a variation in quality of an image caused by a difference in reflection position on the front glass when the angle of the concave mirror is changed.

Incidentally, the positions A (A'), B (B') and C (C') in FIG. 6A (FIG. 6B) may be associated with the positions of the grids A, B and C in FIG. 2A.

Figure 7A:
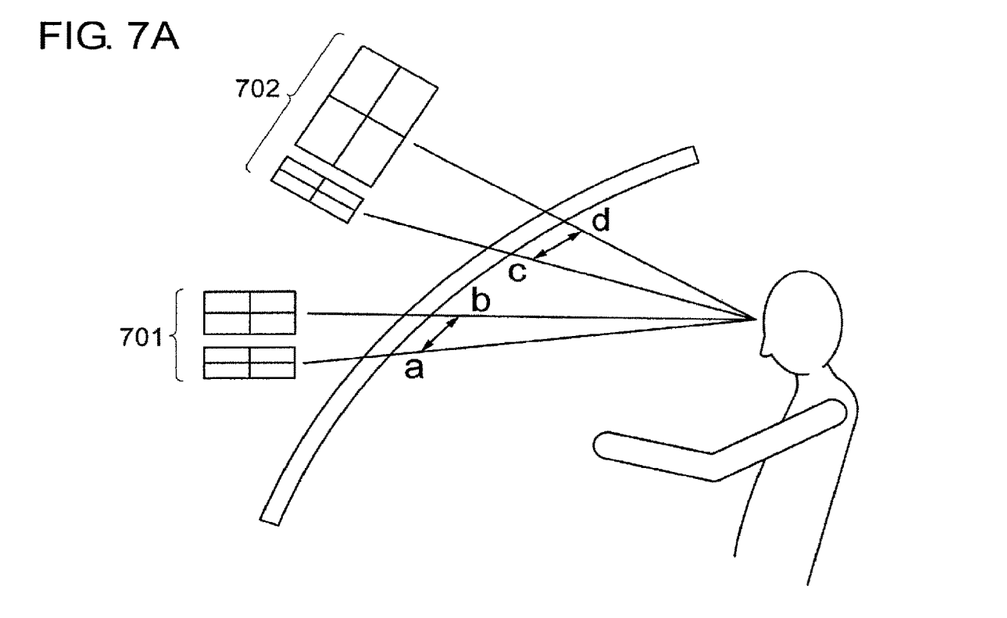
FIG. 7A and FIG. 7B are conceptual views explaining a local deformation amount (magnification factor) of an image (grid) when a line of sight is moved in a case where a plurality of HUD units are present, including a conceptual view (FIG. 7A) of a background-art front glass, and a conceptual view (FIG. 7B) of the front glass in FIG. 3.
Figure 7B:
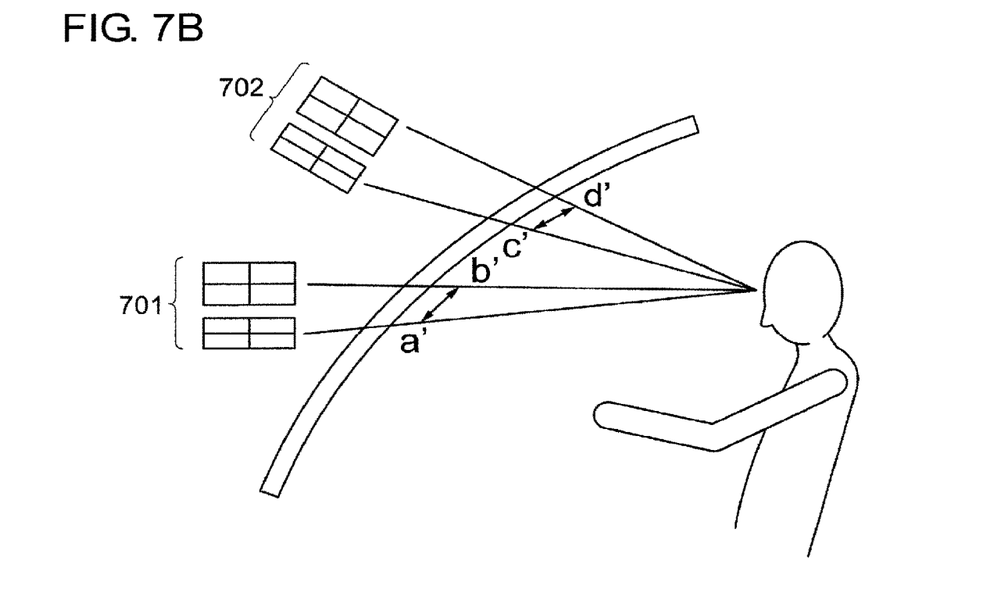

Further, as shown in FIG. 7A and FIG. 7B, it may be assumed that a plurality of HUD units are provided, and images are displayed at a plurality of places on the front glass. FIG. 7A shows the background-art front glass, and FIG. 7(b) shows the front glass in FIG. 3.

In the background-art front glass in FIG. 7A, there is a difference between the absolute value of a deformation amount when an image 701 is moved from a point a to a point b and the absolute value of a deformation amount when an image 702 is moved from a point c to a point d.

Accordingly, as shown in FIG. 7A, an image is apt to be deformed largely only when the image is moved from the point c to the point d.

On the other hand, in the front glass in FIG. 3, in which the variation of the curvature is constant, the absolute value of a deformation amount when the image 701 is moved from a point a' to a point b' is equal to the absolute value of a deformation amount when the image 702 is moved from a point c' to a point d'. That is, due to the same deformation amount (magnification factor) between the point b' and the point d', a driver can observe two HUDs without any sense of strangeness.

In this manner, in spite of a plurality of different HUD units, it is possible to reduce a variation in quality of an image caused by a difference in reflection position on the front glass when the angle of the concave mirror is changed.

In addition, according to the front glass in FIG. 3, even when a displayed image has a certain area, the image can have a constant deformation amount within the area. Particularly when the image has a large area, a conspicuous effect can be exerted.

Figure 8A:
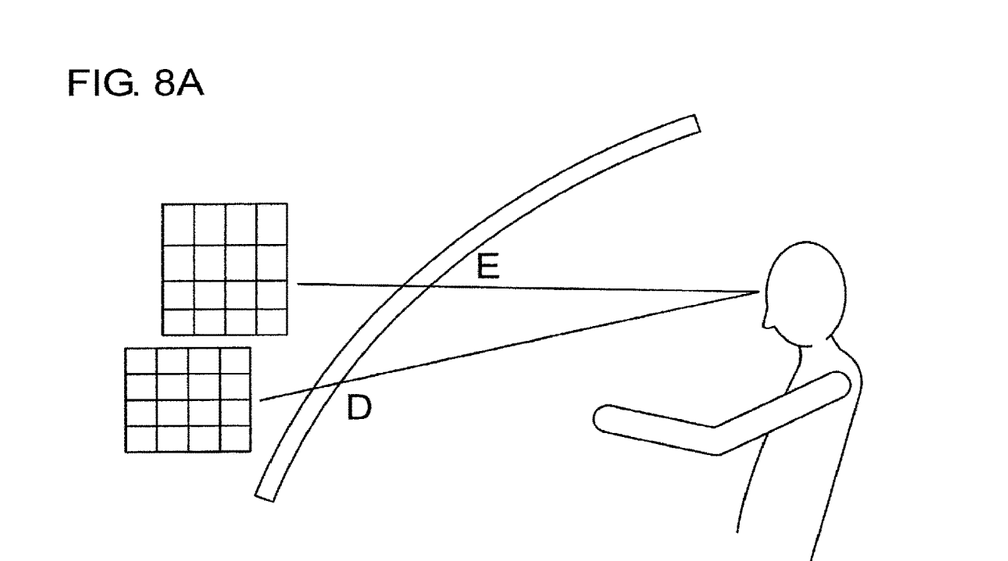
FIG. 8A and FIG. 8B are conceptual views explaining a local deformation amount (magnification factor) of an image (grid) when a line of sight is moved, including a conceptual view (FIG. 8A) of the background-art front glass explaining a state in which an image is deformed due to a local difference in magnification factor, and a conceptual view (FIG. 8B) of the front glass in FIG. 3 explaining a state in which deformation is prevented because there is no difference in local magnification factor.
Figure 8B:
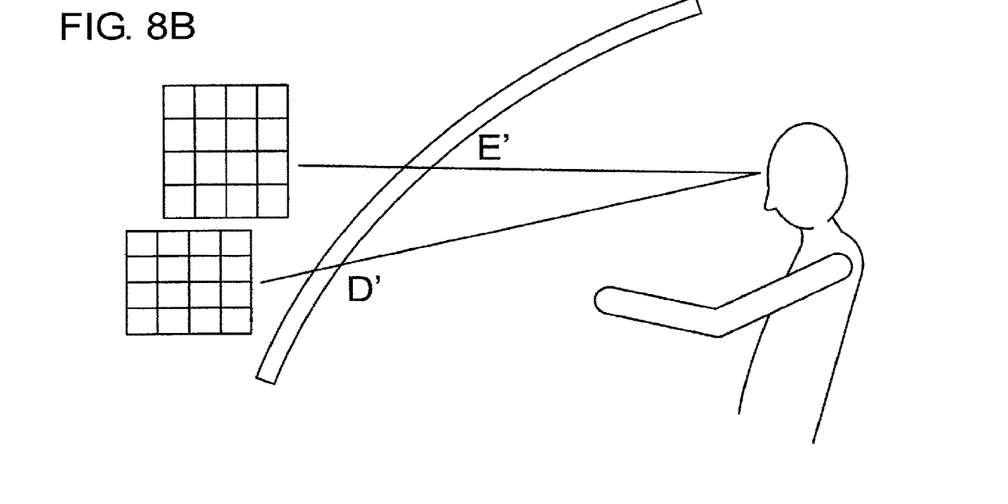

Specific examples will be described with reference to FIG. 8A and FIG. 8B. FIG. 8A shows the background-art front glass, and FIG. 8B shows the front glass in FIG. 3. Assume that the concave mirror is optimized in accordance with the curvature of the glass at a point D (D'), and the angle of the concave mirror is changed by a driver to display an image at a point E(E').

In this case, in the background-art front glass as shown in FIG. 8A, the variation amount in curvature of the front glass within an area where an image is displayed is not constant when the image has at least a predetermined area. Therefore, as shown in FIG. 8A, there is a fear that the image may be deformed due to a local difference in magnification factor. FIG. 8A shows such an example, in which an image having a magnification factor gradually increasing from a lower end of the displayed area of the image to an upper end thereof is displayed at the point E.

On the other hand, as shown in FIG. 8B, in the front glass in FIG. 3, the variation amount in curvature is constant in any position in the vertical direction. Therefore, there is no local difference in magnification factor within an area where an image is displayed. Thus, the image magnified at the same factor in any area is displayed at the point E. That is, the variation of deformation can be suppressed within the area where the image is displayed. Thus, it is possible to prevent an event where a distorted image is visually recognized.

Figure 9A:
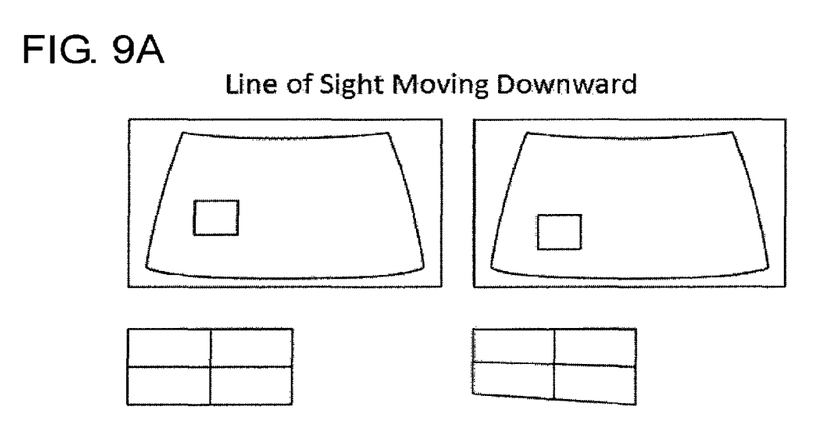
FIG. 9A and FIG. 9B are conceptual views explaining deformation between a left part and a right part of an image, including a conceptual view (FIG. 9A) of the background-art front glass explaining a state in which deformation occurs between a left part and a right part of an image, and a conceptual view (FIG. 9B) of the front glass in FIG. 3 explaining a state in which no deformation occurs between a left part and a right part of an image.
Figure 9B:
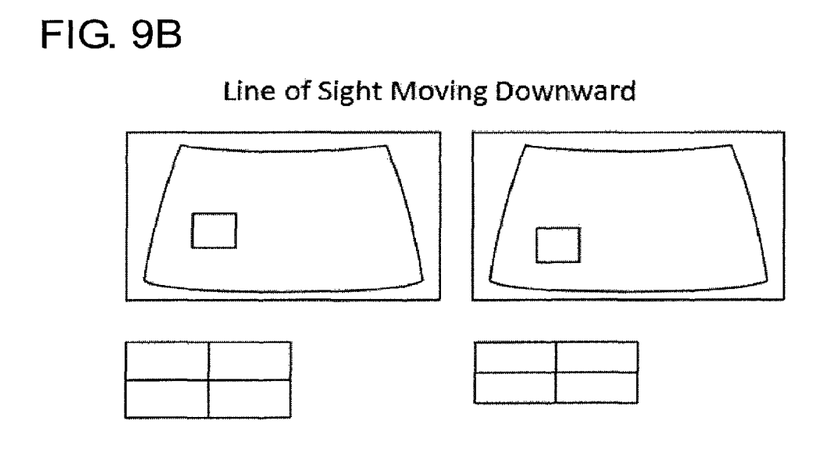

Further, in the front glass having a special curved shape as shown in FIG. 3, it is preferable that the variation of the curvature is constant between different positions in a horizontal direction. As a result, even when a line of sight is moved in the horizontal direction, the deformation amount of an image can be constant between the left end and the right end. In the background-art front glass as shown in FIG. 9A, the variation of the curvature differs from one position to another in the horizontal direction. Therefore, there is a fear that a displayed image may be deformed when the image is moved downward by a predetermined distance. On the other hand, in a front glass having a constant variation of the curvature in any position in the horizontal direction as shown in FIG. 9B, there is no local difference in magnification factor. Therefore, when the angle of the concave mirror is changed, a variation in quality of an image caused by a difference in reflection position on the front glass and a variation in deformation within an area where the image is displayed can be also suppressed in the horizontal direction.

As described above, there is a substantially linear correlation between the curvature of a front glass and deformation of an image. Therefore, when the front glass shown in FIG. 3 is used and the concave mirror is designed to be optimized at a point on the front glass, deformation of an image can be suppressed independently of whether the angle of the concave mirror is adjusted or not, or whether the image has an area or not. The configuration of the front glass having a special curved shape as shown in FIG. 3 will be described below.

Incidentally, it is ideally preferable that the variation of the curvature is constant. It is however difficult to fix the variation of the curvature, strictly in manufacturing. Therefore, in the following description, it will be provided that a maximum value of the variation of the curvature and an average value of the variation of the curvature are made not higher than certain values respectively in order to attain the effect of the invention. Here the words "maximum value of the variation of the curvature" designates a maximum value of the absolute value of the variation of the curvature.

In the present specification, an area where a HUD image is displayed in a front glass (hereinafter referred to as "HUD display area"), a variation amount in size of the image before and after a change of a reflection point is measured at least for each of segments divided at an interval (pitch) of 10 mm in the vertical direction. The variation of the size between adjacent ones of the segments will be referred to as "local deformation".

In order to prevent an image from being recognized as a distorted image by a driver, a difference in variation of size between adjacent segments in the HUD display area is preferably suppressed within 15%, more preferably suppressed within 13%, further more preferably suppressed within 10%. Those are values obtained as a result of sensory evaluation. In the sensory evaluation, a plurality of images in which images of meters to be displayed on a surface of a front glass were actually deformed partially to be magnified in some steps. A plurality of persons began to recognize the images as distorted images at the aforementioned values.

Figure 10:
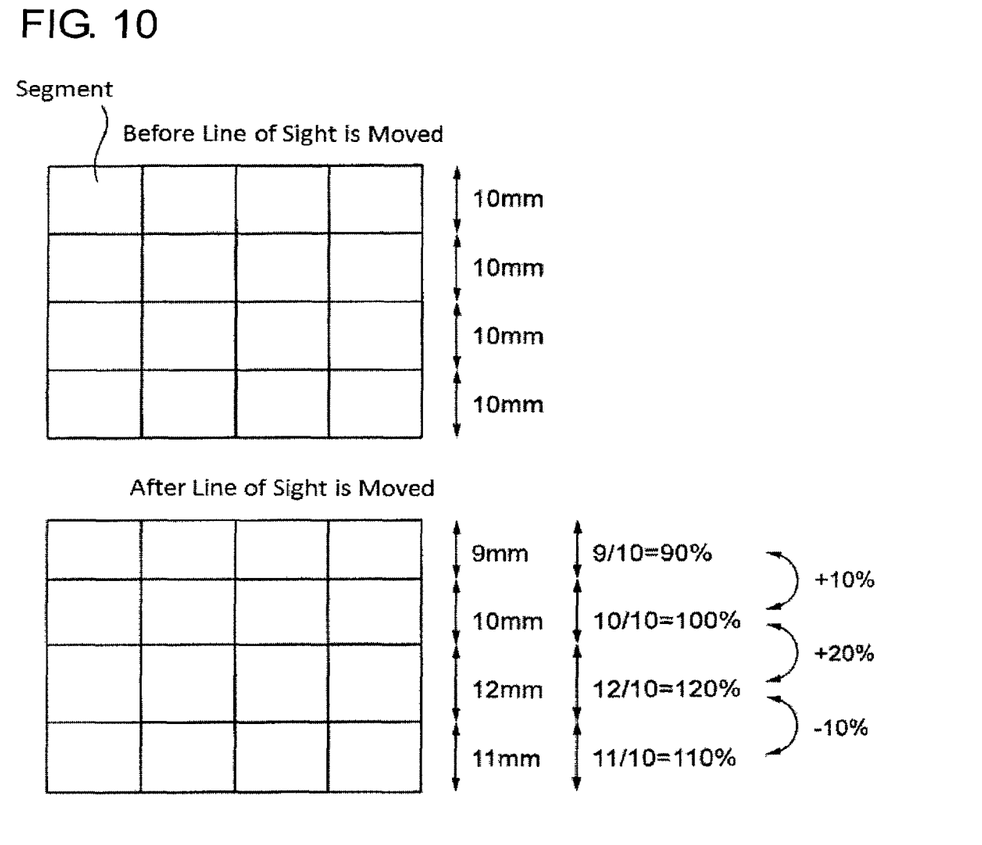
FIG. 10 is a conceptual view explaining a deformation amount in each segment of an image before and after movement of a line of sight.

FIG. 10 explains such a concept. In FIG. 10, pitches to adjacent two segments in the vertical direction before movement of a reflection point are 10 mm. When the pitches to the two adjacent segments in the vertical direction after the movement of the reflection point are 11 mm and 12 mm respectively, the difference in variation amount is 120%–110%=10%. In this case, therefore, the image is hardly recognized as a distorted image by a driver.

On the other hand, when the pitches to the two adjacent segments in the vertical direction after the movement of the reflection point are 10 mm (no change) and 12 mm respectively, the difference in variation amount reaches 120%–100%=20%. Thus, in this case, the image is apt to be recognized as a distorted image by the driver.

Figure 11:
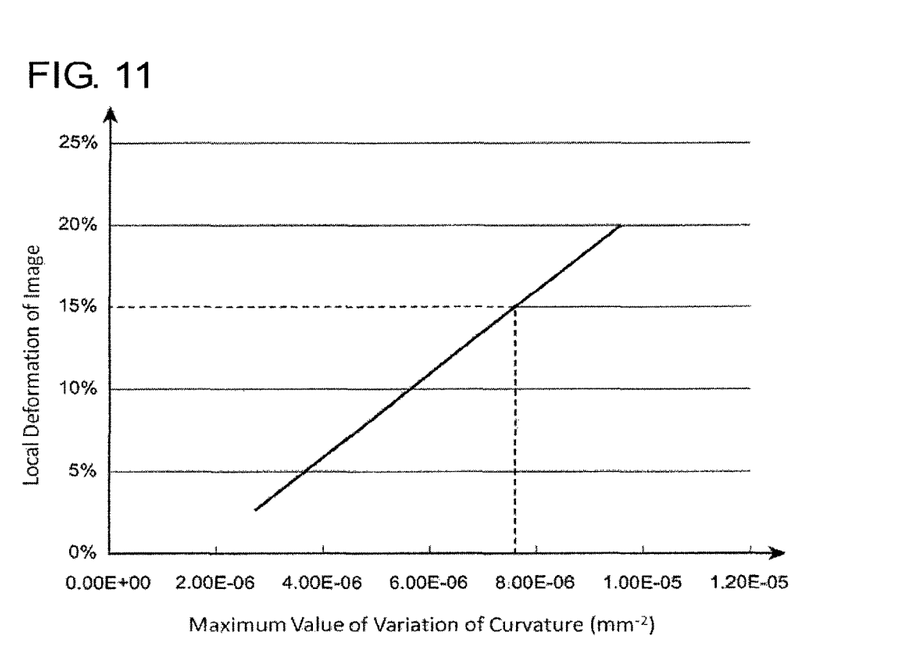
FIG. 11 is a graph showing a result of calculation using optical simulation.

FIG. 11 shows a result of calculation using optical simulation. When the maximum value of the variation of the curvature in the vertical direction of the front glass is ±7.6E-6 mm$^{-2}$ or less within the HUD display area, the local deformation of an image can be suppressed within 15% so that the image can be prevented from being easily recognized as a distorted image by the driver. Further, when the maximum value of the variation of the curvature is ±6.55E-6 mm$^{-2}$ or less, the local deformation can be suppressed within 13%, and further when the maximum value of the variation of the curvature is ±5.60E-6 mm$^{-2}$ or less, the local deformation can be suppressed within 10% more preferably. That is, a variation in deformation at any point within the area where the image is displayed can be suppressed. Incidentally, in the part of "E-figure", the figure designates an exponent of 10. "E-6" designates the value of 10 raised to the power of −6. For example, ±7.6E-6 designates ±7.6× 10$^{-6}$.

Here the words "before movement of a reflection point" means a state in which a point on the front glass where the curvature of the concave mirror has been set to be optimal serves as a reflection point, and the words "after the movement of the reflection point" means a state in which the reflection point has been moved from that point on the front glass.

Figure 12:
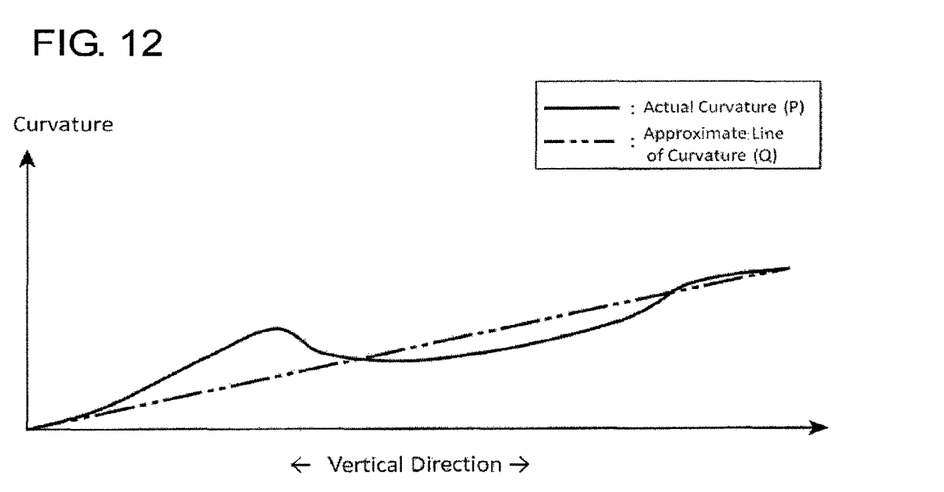
FIG. 12 is a schematic graph showing an actual curvature (P), and an approximate line (approximate line Q of the curvature) in which the actual curvature is approximated by a linear function.
Figure 13:
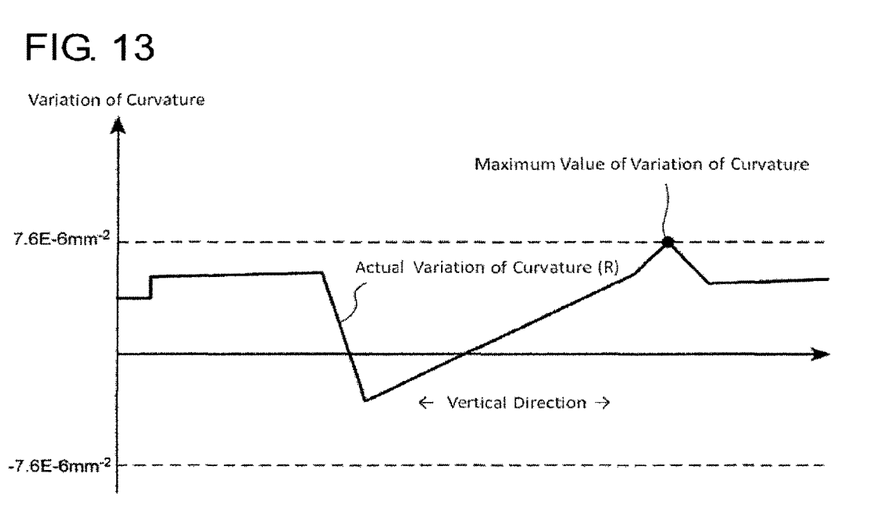
FIG. 13 is a graph showing a concept of an actual variation amount (R) of the curvature, and a concept of a maximum value of the variation of the curvature.

FIG. 12 and FIG. 13 are schematic graphs each showing an actual curvature (P), and an approximate line (approximate line Q of the curvature) in which the actual curvature is approximated by a linear function, and the variation amount (R) of the actual curvature in order to explain the "maximum value of the variation of the curvature" of the front glass. As shown in FIG. 12 and FIG. 13, in the actual front glass, the value of the curvature and the value of the variation of the curvature rise and fall moment by moment. When the approximate line of the curvature and the average value of the variation of the curvature are obtained, a curvature increasing monotonically and a constant variation of the curvature can obtained as shown in the graph (c) of FIG. 3 and the graph (d) of FIG. 3.

Incidentally, the approximate line of the curvature can be derived from, of cross-sections of the front glass in the vertical direction, a curvature in a desired section within the HUD display area. For example, the approximate line may be obtained from values of curvatures measured at every interval of 5 mm on a desired cross-section within the HUD display area.

FIG. 13 shows a concept of the maximum value of the variation of the curvature. An actual curvature may increase locally on a large scale. The variation of the actual curvature may take a peak value accordingly as shown in FIG. 12. Such a peak value is regarded as a "maximum value of the variation of the curvature", and the maximum value is suppressed to be preferably ±7.6E-6 mm$^{-2}$ or less, more preferably ±6.55E-6 mm$^{-2}$ or less, or further more preferably ±5.60E-6 mm$^{-2}$ or less. Thus, the variation of deformation at any point within the area where the image is displayed can be suppressed so that the image can be prevented from being easily recognized as a distorted image by the driver.

In addition, as shown in the graph (c) of FIG. 3, FIG. 11 and FIG. 12, it is preferable that a line of a curvature approximated by a linear function increases monotonically from the lower side of the front glass to the upper side thereof. In this manner, the variation of the curvature can be prevented from changing drastically, so that an image can be prevented from being recognized as a distorted image by the driver.

In addition, in FIG. 13, description has been made about a local deformation (between adjacent segments at an interval of 10 mm within an area where an image is displayed) paying attention to the "maximum value of the variation of the curvature". However, in consideration of a variation in quality of the image caused by a difference in reflection position on the front glass when the angle of the concave mirror is changed, it is preferable that the variation of the curvature can be suppressed to be not higher than a predetermined value at least all over the HUD display area. To that end, the average value of the curvature in the vertical direction is preferably ±1.64E-6 mm$^{-2}$ or less, more preferably ±1.42E-6 mm$^{-2}$ or less, further more preferably ±1.2E-6 mm$^{-2}$ or less.

Figure 14:
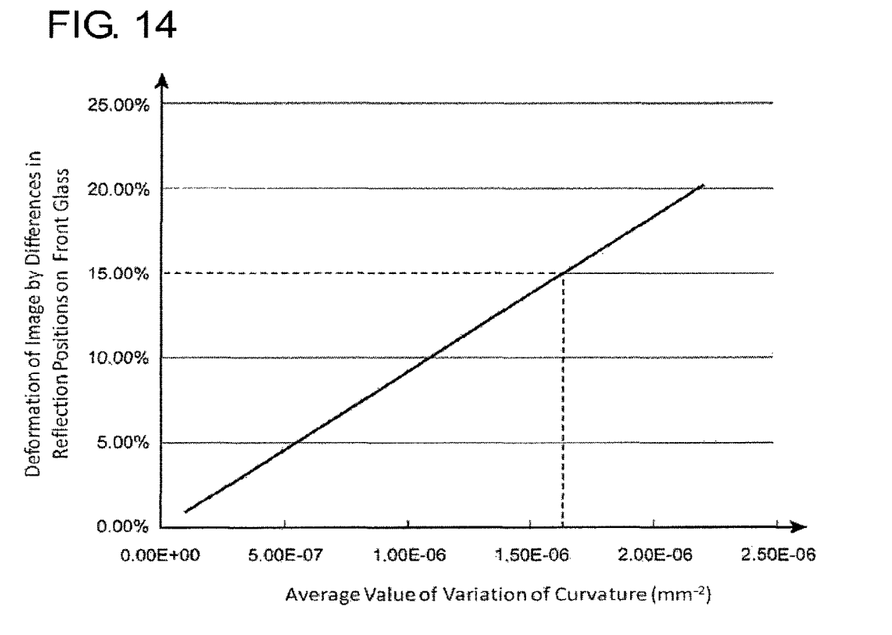
FIG. 14 is a graph showing a result of calculation using optical simulation.

FIG. 14 shows a result of calculation using optical simulation. When the average value of the curvature in the vertical direction is ±1.64E-6 mm$^{-2}$ or less, the deformation of an image caused by a difference in reflection position on the front glass can be suppressed to be 15% or less, so that the image can be prevented from being easily recognized as a distorted image by the driver. Further, when the average value of the curvature is ±1.42E-6 mm$^{-2}$ or less, the deformation can be more preferably suppressed to be 13% or less. Further, when the average value of the curvature is ±1.2E-6 mm$^{-2}$ or less, the deformation can be more preferably suppressed to be 10% or less.

Figure 15:
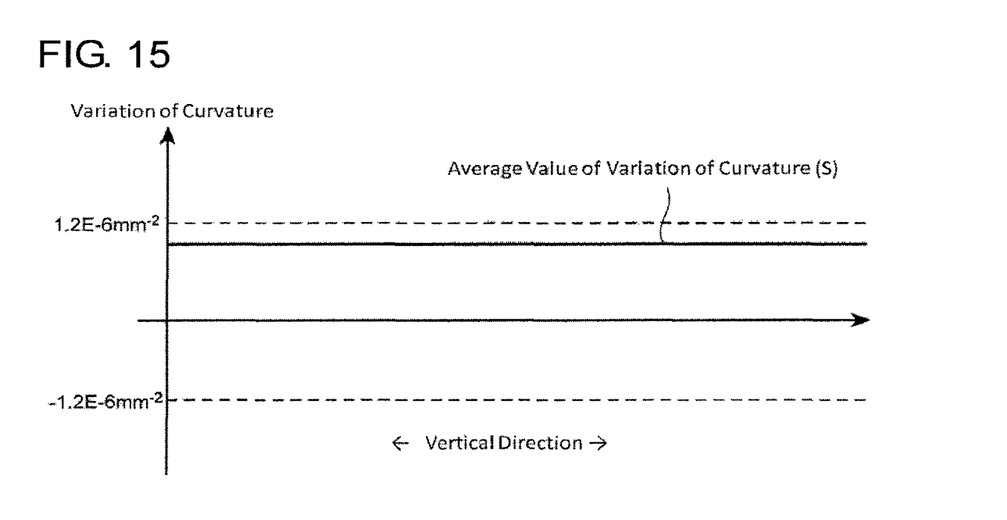
FIG. 15 is a graph showing a concept of an average value (S) of the variation of the curvature.

FIG. 15 shows a concept of an average value (S) of the variation of the curvature. When the average value of the variation of the curvature is suppressed to be not higher than a predetermined value, deformation of an image can be suppressed all over the HUD display area.

Figure 16:
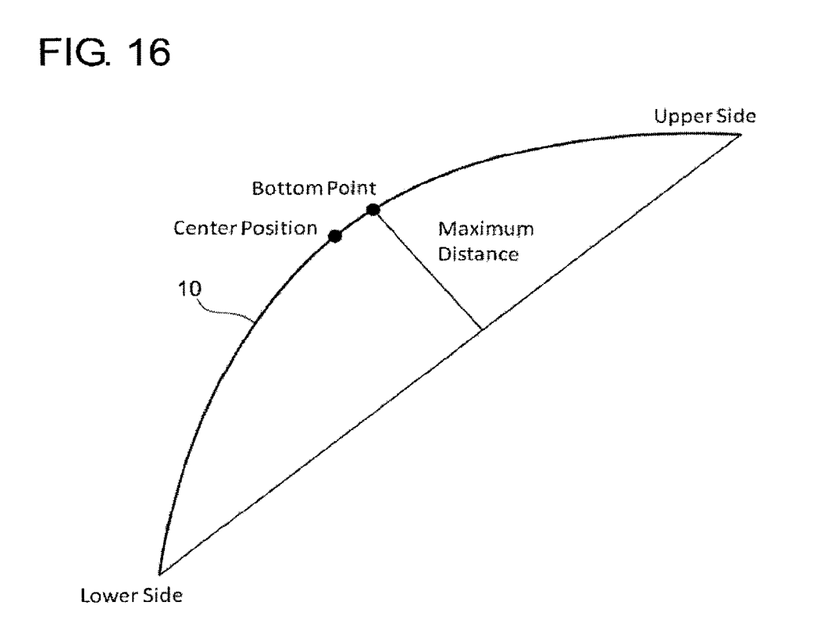
FIG. 16 is a cross-sectional view showing an upper side, a lower side and a bottom point of the front glass.

In addition, as shown in FIG. 16 it is preferable that a position most distant from a chord connecting the upper side and the lower side serving as a reference in the front glass according to the embodiment of the present invention, that is, a so-called bottom point is located more closely to the upper side than a center position (a position at equal distances from the upper side and the lower side) in the vertical direction. When the bottom point is located in such a position, the front glass can be desirably connected to a roof of a car without any trouble.

In addition, it is preferable that the difference in curvature between a left end portion and a right end portion in the HUD display area is 0.00040 mm$^{-1}$ or less. The difference in curvature between the left end portion and the right end portion is preferably 0.00030 mm$^{-1}$ or less, more preferably 0.00020 mm$^{-1}$ or less. In this manner, the deformation amounts of the image at the left end and the right end can be reduced even if a line of sight is moved in the horizontal direction. Thus, it is possible to prevent the image from being easily recognized as a distorted image by the driver.

In addition, it is preferable that the maximum value of the curvature of the front glass is 0.001 mm$^{-1}$ or less in the HUD display area. In this manner, the driver can regard the image as not distorted.

The aforementioned values of the curvature and the variation of the curvature must be satisfied at least within the HUD display area of the front glass. However, it is not necessary to satisfy the values outside the HUD display area.

It is preferable that the HUD display area is 10 cm$^2$ or more. When the HUD display area is 10 cm$^2$ or more, the driver can easily recognize distortion in an image. Therefore, the front glass in FIG. 3 according to the embodiment of the present invention can be suitably used.

The upper limit of the HUD display area is not specified especially. For example, it is preferable that the HUD display area is 1,000 cm$^2$ or less. When the HUD display area is 1,000 cm$^2$ or less, the HUD display area can be prevented from overlapping with an area where plane stress is formed on the front glass. Thus, perspective distortion is rarely provided within the HUD display area. Thus, the aforementioned upper limit is preferable.

Incidentally, the area where plane stress is formed, which can be easily understood by those in the art, is formed at an outer peripheral edge of a glass plate and inside the outer peripheral edge when the glass plate heated to the vicinity of its softening point is cooled. During the cooling, the glass plate is cooled from the outer peripheral edge, and edge compression is formed at the outer peripheral edge of the glass plate. To be paired with the edge compression, inner tension is formed inside the outer peripheral edge of the glass plate.

In addition, it is preferable that the HUD display area is located on a plane central side of the area where the plane stress is formed in the front glass surface. That is, it is desired that the HUD display area does not overlap with the area where the plane stress is formed. The area where the plane stress has been formed is not limited specially, but corresponds to, for example, an area located at a distance of less than 20 mm on the plane central side from the outer peripheral edge. It is therefore preferable that the HUD display area is provided at a distance of at least 20 mm on the plane center side from the outer peripheral edge. In this manner, perspective distortion can be prevented from being easily provided within the HUD display area.

The front glass according to the present invention can be, for example, obtained by processing a general laminated glass. At the time of press molding, the shapes of molding faces of forming molds are devised so that a front glass having a special curved shape as in the present invention can be manufactured.

When the front glass has been attached to a vehicle, not to say, the vertical direction can be defined, and the upper side and the lower side can be also defined uniquely. In addition, an inspection certificate is typically pasted on the front glass. The inspection certificate is, for example, a JIS mark for proving the front glass to satisfy the JIS standards, or a mark indicating a product production time, a trade name of the glass, etc. The inspection certificate is provided chiefly in a left lower position or a right lower position. In some type of inspection certificate, the glass is injured for marking by sand blasting when the glass is manufactured. In another type of inspection certificate, printing is performed on the glass. Thus, in a front glass that has not been attached to a vehicle yet but is provided alone, a side located closely to a position where an inspection certificate is disposed may be defined as the lower side, and a side located distantly from the position may be defined as the upper side.

Incidentally, the specification of the present invention has been described along a front glass by way of example. However, the present invention is not limited to the front glass. That is, the present invention may be applied to a side glass, a roof glass or a rear glass. In addition, the present invention may be applied to resin such as polycarbonate.

Incidentally, in the specification of the present invention, it is assume that the concave mirror has a desired constant curvature. However, the concave mirror may also have a curvature having a constant change rate in the variation of the curvature.

In this case, it is preferable that the variation of the curvature of the concave mirror is set as follows. That is, when the maximum value of the variation of the curvature in the vertical direction of the front glass is ±22.8E-6 mm$^{-2}$ or less within the HUD display area, local deformation of an image can be suppressed within 15% so that the image can be prevented from being easily recognized as a distorted image by the driver. Further, when the maximum value of the variation of the curvature is ±19.65E-6 mm$^{-2}$ or less, the local deformation of the image can be suppressed within 13%. When the maximum value of the variation of the curvature is ±16.8E-6 mm$^{-2}$ or less, the local deformation of the image can be more preferably suppressed within 10%. Thus, a variation in deformation at any point within the area where the image is displayed can be suppressed.

On the other hand, when the average value of the variation of the curvature in the vertical direction is ±4.92E-6 mm$^{-2}$ or less, deformation of the image caused by a difference in reflection position on the front glass can be suppressed within 15% so that the image can be prevented from being easily recognized as a distorted image by the driver. Further, when the average value of the variation of the curvature is ±4.26E-6 mm$^{-2}$ or less, the deformation can be suppressed within 13% more preferably. When the maximum value of the variation of the curvature is ±3.6E-6 mm$^{-2}$ or less, the deformation can be suppressed within 10% more preferably.

In addition, both the curvature of the concave mirror and the curvature of the front glass may have variations respectively. On this occasion, it is preferable that the curvature at the reflection point of the concave mirror is smaller with increase in the curvature at the reflection point of the front glass. In this manner, deformation of an image can be more suppressed. Incidentally, the curvature of the concave mirror and the curvature of the front glass are not limited to the aforementioned ones. It is preferable to combine the curvature of the concave mirror and curvature of the front glass so that the curvature at the reflection point in one of the two is changed to be smaller when the curvature at the reflection point in the other is changed to be larger.

In addition, it is preferable that the variation of the curvature of the concave mirror is 1.5 to 3 times as large as the variation of the curvature of the front glass. In this manner, deformation of an image can be more suppressed.

Incidentally, the invention is not limited to the aforementioned embodiment, but deformations, improvements, etc. can be made suitably. In addition, materials, shapes, dimensions, numerical values, forms, numbers, arrangement places, etc. of respective constituent elements in the aforementioned embodiment are not limited. Any materials, any shapes, any dimensions, any numerical values, any forms, any numbers, any arrangement places, etc. may be used as long as the invention can be attained.

INDUSTRIAL APPLICABILITY

According to the present invention, it is possible to provide a vehicle front glass capable of suppressing deformation of an image projected by a HUD and properly displaying the image.

DESCRIPTION OF REFERENCE NUMERALS AND SIGNS 10 front glass (vehicle front glass, vehicle window plate)
20 HUD unit
21 concave mirror
23 reflecting mirror
25 light source (display)
100 car

The invention claimed is:

1. A vehicle window plate, wherein:
   a maximum value of a variation of a curvature in a vertical direction is ±7.6E-6 mm$^{-2}$ or less at least within a HUD display area of the vehicle window plate; and
   a position most distant from a chord connecting an upper side and a lower side serving as a reference is located more closely to the upper side than a center position in the vertical direction.

2. The vehicle window plate according to claim 1, wherein:
   the curvature increases monotonically from the lower side to the upper side at least within the HUD display area.

3. The vehicle window plate according to claim 1, wherein:
   an average value of the variation of the curvature in the vertical direction is ±1.2E-6 mm$^{-2}$ or less at least within the HUD display area.

4. The vehicle window plate according to claim 1, wherein:
   the variation of the curvature is constant at least within the HUD display area.

5. The vehicle window plate according to claim 1, wherein:
   a difference in curvatures between a left end portion and a right end portion is 0.00040 mm$^{-1}$ or less at least within the HUD display area.

6. The vehicle window plate according to claim 1, wherein:
   a maximum value of the curvature is 0.001 mm$^{-1}$ or less at least within the HUD display area.

7. The vehicle window plate according to claim 1, wherein:
   the HUD display area is 10 cm$^2$ or more.

8. The vehicle window plate according to claim 1, wherein:
   the vehicle window plate is a glass plate;
   the glass plate has an area where a plane stress is formed at an outer peripheral edge and inside the outer peripheral edge; and
   the HUD display area dose not overlap with the area where the plane stress is formed.

9. The vehicle window plate according to claim 2, wherein:
   an average value of the variation of the curvature in the vertical direction is ±1.2E-6 mm$^{-2}$ or less at least within the HUD display area.

10. The vehicle window plate according to claim 2, wherein:
    a difference in curvatures between a left end portion and a right end portion is 0.00040 mm$^{-1}$ or less at least within the HUD display area.

11. The vehicle window plate according to claim 2, wherein:
    a maximum value of the curvature is 0.001 mm$^{-1}$ or less at least within the HUD display area.

12. The vehicle window plate according to claim 2, wherein:
    the HUD display area is 10 cm$^2$ or more.

13. The vehicle window plate according to claim 2, wherein:
    the vehicle window plate is a glass plate;
    the glass plate has an area where a plane stress is formed at an outer peripheral edge and inside the outer peripheral edge; and
    the HUD display area dose not overlap with the area where the plane stress is formed.

14. The vehicle window plate according to claim 3, wherein:
    a difference in curvatures between a left end portion and a right end portion is 0.00040 min$^{-1}$ or less at least within the HUD display area.

15. The vehicle window plate according to claim 3, wherein:
    a maximum value of the curvature is 0.001 mm$^{-1}$ or less at least within the HUD display area.

16. The vehicle window plate according to claim 3, wherein:
    the HUD display area is 10 cm$^2$ or more.

17. The vehicle window plate according to claim 3, wherein:
    the vehicle window plate is a glass plate;
    the glass plate has an area where a plane stress is formed at an outer peripheral edge and inside the outer peripheral edge; and
    the HUD display area dose not overlap with the area where the plane stress is formed.

18. The vehicle window plate according to claim 4, wherein:
    a difference in curvatures between a left end portion and a right end portion is 0.00040 mm$^{-1}$ or less at least within the HUD display area.

19. The vehicle window plate according to claim 4, wherein:
    a maximum value of the curvature is 0.001 mm$^{-1}$ or less at least within the HUD display area.

20. The vehicle window plate according to claim 4, wherein:
    the HUD display area is 10 cm$^2$ or more.

* * * * *